United States Patent [19]

Ruibal

[11] Patent Number: 5,606,824
[45] Date of Patent: Mar. 4, 1997

[54] ELEVATED PLANT HOLDER

[76] Inventor: Michael A. Ruibal, 607 May Rd., Seagoville, Tex. 75159

[21] Appl. No.: 529,421

[22] Filed: Sep. 18, 1995

Related U.S. Application Data

[62] Division of Ser. No. 100,078, Jul. 30, 1993, Pat. No. 5,450,692.

[51] Int. Cl.$^6$ ................................................. A01G 9/12
[52] U.S. Cl. ................................................. 47/70
[58] Field of Search ....................... 47/6 GC, 70, 82, 47/83; 248/153, 146

[56] References Cited

U.S. PATENT DOCUMENTS

| D. 207,915 | 6/1967 | Zimmerman | D35/3 |
|---|---|---|---|
| D. 221,571 | 8/1971 | Stevens | D35/3 |
| D. 649,697 | 5/1980 | Klokner | 248/146 |
| 706,821 | 8/1902 | Hart | 47/83 |
| 2,720,056 | 10/1955 | Levy | 47/41 |
| 2,803,923 | 8/1957 | Pratt | 47/39 |
| 3,030,735 | 4/1962 | Bodkins | 47/39 |
| 3,165,863 | 1/1965 | Daran | 47/70 |
| 3,293,798 | 12/1966 | Johnson, Sr. | 47/34.12 |
| 3,554,473 | 1/1971 | Rakov | 47/70 |
| 4,006,559 | 2/1977 | Carlyon, Jr. | 47/39 |
| 4,250,666 | 2/1981 | Rakestraw | 47/83 |
| 4,908,982 | 3/1990 | Quatrini | 47/39 C |
| 5,450,691 | 9/1995 | Christie | 47/83 |

FOREIGN PATENT DOCUMENTS

| 8901103 | 3/1990 | Netherlands | 47/70 |
|---|---|---|---|
| 2247816 | 3/1992 | United Kingdom | 47/70 |

*Primary Examiner*—Henry E. Raduazo
*Attorney, Agent, or Firm*—L. Dan Tucker

[57] ABSTRACT

There is provided an elevated plant holder which is supported entirely from an ordinary plant or flower pot having a tapered interior surface. The plant holder includes an upstanding pole having a lower end near the bottom of the plant pot and an upper end. A pair of horizontally extending cross arms is provided for securing the pole at a point intermediate its ends and within the plant pot to the tapered interior surface of the plant pot. The upstanding pole passes through a central orifice in each cross arm. The opposite ends of the cross arms are disposed against the tapered interior surface of the plant pot. The longitudinal axes of the cross arms are disposed substantially perpendicularly to one another and lie in substantially adjacent planes perpendicular to the longitudinal axis of the pole. A wire basket is attached to the upper end of the pole for holding the plant. In an alternative embodiment, a wire frame is provided for securing the pole to the interior surface of the plant pot. The upstanding pole passes through a central orifice in the frame.

6 Claims, 2 Drawing Sheets

ELEVATED PLANT HOLDER

This application is a division of prior application Ser. No. 08/100,078, filed Jul. 30, 1993, now U.S. Pat. No. 5,450,692.

TECHNICAL FIELD OF THE INVENTION

This invention relates to potted plant holders, and, more particularly, is concerned with a device for supporting one or more plants above a plant pot having a tapered or non-tapered interior surface.

BACKGROUND OF THE INVENTION

Many types of plant holders, stands, and racks have been made. For example, U.S. Pat. No. 4,250,666, issued to Rakestraw, discloses a device for supporting plants in which a plurality of trays or shelves are mounted on a central support. U.S. Pat. No. 4,006,559, issued to Carlyon, Jr., discloses a self-irrigating display rack for potted plants which comprises a tier of display dishes supported on a reservoir base. The display dishes are mounted in vertically spaced coaxial positions on an upright central tubular member which, in turn, is supported on the base. U.S. Pat. No. 3,293,798, issued to Johnson, Sr., discloses a vertical tiered sectional planter in which a central vertical tubular perforated standard is surrounded by concentric, upwardly-flared pan-shaped sections which are secured to the standard. U.S. Pat. No. 2,720,056, issued to Levy, discloses a combined lamp and flower receptacle in which a plurality of bowls are attached to a tubular column in a tiered arrangement. U.S. Pat. No. 3,030,735, issued to Bodkins, discloses a structure for mounting a planter box in vertically adjustable position upon a vertical pole. U.S. Pat. No. 2,803,923, issued to Pratt, discloses a wheeled indoor portable garden stand having a tiered arrangement of boxes. Finally, U.S. Pat. No. 207,915, issued to Zimmerman, and U.S. Pat. No. 221,571, issued to Stevens, disclose other types of tiered planters.

All of these prior art plant stands utilize a specialized base or floor support made specifically for supporting the plant stand. Inasmuch as pottery, metal, or plastic flower pots are relatively inexpensive, widely commercially available, and frequently already owned by persons desiring an apparatus for supporting one or more plants above the ground level, a need exists for an elevated plant holder which can be supported entirely from an ordinary plant or flower pot. Preferably, such a plant holder will be decorative and attractive in appearance, and will permit the plant pot from which it is supported to also contain one or more plants in the traditional manner. Such a plant holder will also preferably be inexpensive to manufacture, simple to assemble and install in a plant pot, and adaptable for use in plant and flower pots of varying sizes.

SUMMARY OF THE INVENTION

The present invention provides an elevated plant holder which answers the aforementioned needs. The elevated plant holder is supported entirely from an ordinary plant or flower pot having a tapered interior surface. The plant holder includes an upstanding pole having a lower end near the bottom of the plant pot and an upper end. A pair of horizontally extending cross arms is provided for securing the pole at a point intermediate its ends and within the plant pot to the tapered interior surface of the plant pot. The upstanding pole passes through a central orifice in each, cross arm. The opposite ends of the cross arms are disposed against the tapered interior surface of the plant pot. The longitudinal axes of the cross arms are disposed substantially perpendicularly to one another and lie in substantially adjacent planes perpendicular to the longitudinal axis of the pole. A wire basket is attached to the upper end of the pole for holding the plant.

Several advantages are realized by the elevated plant holder of the present invention. First, the plant holder can be supported from any ordinary pottery, ceramic, metal, or plastic plant pot having a tapered interior surface. Second, the plant holder can be used with plant pots of different sizes without modification to either the plant holder or the plant pot. Third, the plant holder is decorative and attractive in appearance, and will permit the plant pot from which it is supported to also contain one or more plants in the traditional manner. Fourth, the plant holder is inexpensive to manufacture and simple to assemble and install in a plant pot. Fifth, additional wire baskets can easily be mounted on the plant holder pole in a tiered arrangement.

BRIEF DESCRIPTION OF THE DRAWINGS

For a more complete understanding of the present invention, and the advantages thereof, reference is now made to the following Detailed Description of the Invention taken in conjunction with the accompanying drawings in which.

DETAILED DESCRIPTION OF THE INVENTION

Figure 1:
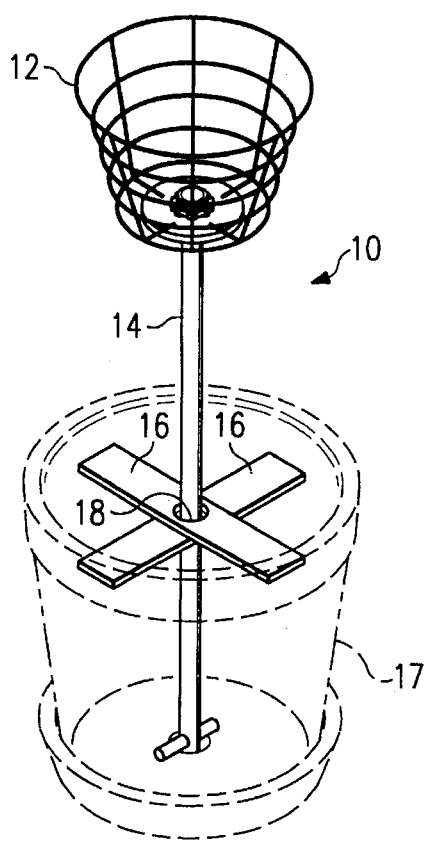
FIG. 1 is a perspective view of an elevated plant holder according to the present invention.

The present invention and its advantages are best understood by referring to the drawings, like numerals being used for like and corresponding parts of the various drawings.

In FIG. 1 there is shown an elevated plant holder, generally designated 10, of the present invention. Plant holder 10 includes wire basket 12, pole 14, and a pair of cross arms 16. Advantageously, plant holder 10 can be supported from an ordinary plant pot 17 of varying sizes. Plant pot 17 can be made from pottery, ceramic, metal, plastic, or any other rigid material. The horizontal cross-section of plant pot 17 can be circular as illustrated in FIG. 1, or can be square, rectangular, octagonal, or hexagonal in shape. The only requirement for plant pot 17 is that its interior wall or walls slope or taper inwardly from top to bottom. Stated differently, its horizontal cross-sectional area must decrease from top to bottom. Most ordinary pottery, ceramic, metal, or plastic plant pots are so shaped and can be used for supporting elevated plant holder 10.

Cross arms 16 are of equal length and are disposed in adjacent planes perpendicular to the longitudinal axis of pole 14. Each cross arm 16 has a centrally located orifice 18 therein and opposite ends disposed against the sloped interior surface of plant pot 17. Pole 14 extends vertically upward from the bottom center of plant pot 17 and passes through orifice 18 in each cross arm 16. The longitudinal axes of cross arms 16 are preferably disposed perpendicularly to one another for securing pole 14 from substantially equally distributed points on the interior surface of plant pot 17. Cross arms 16 preferably comprise flat, rectangular steel plates 1/8 inch thick and 1½ inches wide. Cross arms 16 may alternatively comprise aluminum or plastic. The length of cross arms 16 will vary with the range of sizes of plant pots 17 for which plant holder 10 is designed to be used. Pole 14' preferably comprises hollow steel electrical conduit of ½ inch nominal size, having an 11/16 inch outer diameter. However, any rigid pipe or rod may be used for pole 14. Wire basket 12 is preferably made from gauge 10 steel wire by electric arc welding.

Orifices 18 in cross arms 16 are sized slightly larger than the outer diameter of pole 14 so that cross arms 16 may slide freely up and down pole 14. The location where pole 14 passes through orifices 18 in cross arms 16 will depend on the size of plant pot 17 in which plant holder 10 is used. When used in a relatively smaller plant pot 17, cross arms 16 will be higher on pole 14, and will engage the interior surface of plant pot 17 near its top. When used in a relatively larger plant pot 17, cross arms 16 will drop to a lower point on pole 14, and will engage the interior surface of plant pot 17 farther down from its top.

Figure 2:
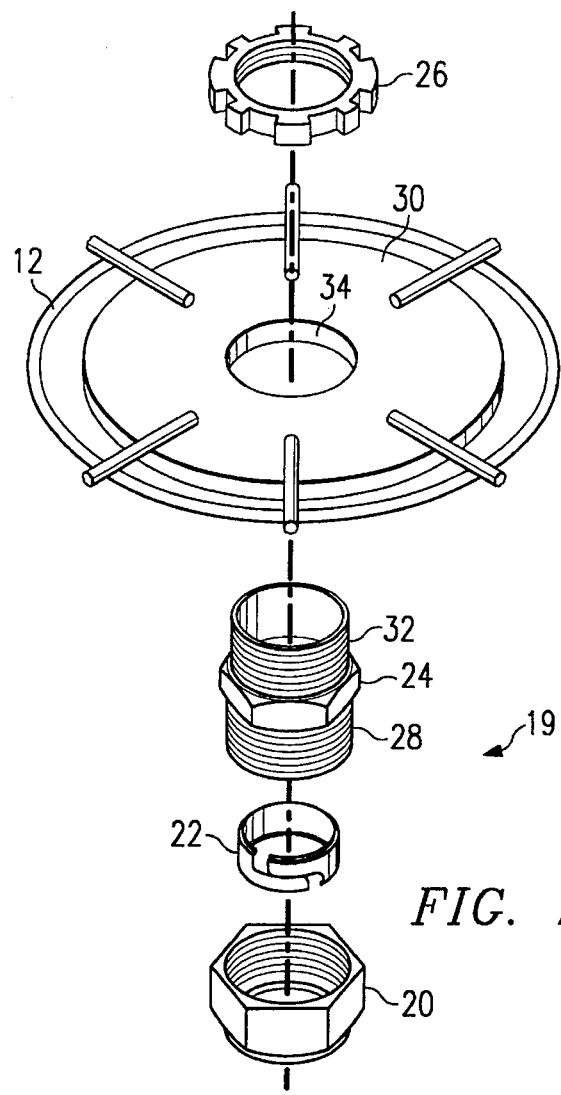
FIG. 2 is a partially fragmented, exploded view illustrating the apparatus for connecting the pole to the wire basket at the top and to the plant pot at the bottom.

Referring now to FIG. 2, there is shown a partially fragmented, exploded view of pole 14 and its connection with wire basket 12 at the top and with plant pot 17 at the bottom. The bottom of wire basket 12 is secured to the upper end of pole 14 by compression connector 19. Compression connector 19 includes lower nut 20, compression ring 22, coupling 24, and upper nut 26. To install wire basket 12 on pole 14, lower nut 20, compression ring 22, and lower end 28 of coupling 24 are first slipped in that order over the upper end of pole 14. Coupling 24 is secured to pole 14 by threading lower nut 20 onto lower end 28 of coupling 24, which action causes compression ring 22 to firmly grip around pole 14. Metal plate 30, which is welded to the center of the bottom of wire basket 12 to facilitate attachment to pole 14, is then placed over upper end 32 of coupling 24 so that upper end 32 protrudes through orifice 34 in plate 30. Upper nut 26 is then threaded onto upper end 32 of coupling 24 to secure wire basket 12 to pole 14. Compression connector 19 is preferably a commercially available electrical conduit end connector. If ½ inch nominal size electrical conduit is used for pole 14, then compression connector 19 is preferably a ½ inch No. 02105 Compression Type Connector, sold by Adalet Manufacturing Co., Cleveland, Ohio.

Most plant pots 17 have an orifice or hole 36 in the center of the bottom to permit excess water to drain from the pot. Drain hole 36 is advantageously used by the plant holder of the present invention to provide a lower anchor point for pole 14. Typically, drain hole 36 has a diameter larger than that of ½ inch electrical conduit used for pole 14. Therefore, the lower end of pole 14 will-fit into hole 36 in the bottom of plant pot 17. Pole 14 will thereby be prevented from pivoting about orifices 18 in cross arms 16, and will be reined in a vertical orientation coaxial with the longitudinal axis of plant pot 17.

However, means should also be provided for anchoring the lower end of pole 14 to the bottom of plant pot 17 so that pole 14 will not pass through hole 36 when plant pot 17 is lifted from the floor or ground surface, as when it is being moved. For this purpose, pin 38 is inserted through transverse orifice 40 located near the lower end of pole 14. Pin 38 extends out from each side of orifice 40 a sufficient distance so as to prevent pole 14 from passing through hole 36. Thus, only the portion of pole 14 below pin 38 will be received into hole 36. If the diameter of drain hole 36 is substantially larger than the diameter of pole 14, then pin 38 is preferably curved slightly with its ends turned upward. By operation of gravity, pole 14 will become centered in plant pot hole 36, and the upward curved ends of pin 38 will tend to prevent pole 14 from becoming off-centered.

Figure 3:
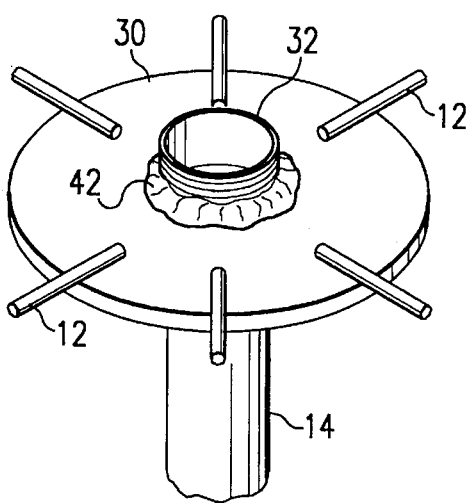
FIG. 3 illustrates an alternative means for connecting the wire basket to the pole.

Referring now to FIG. 3, there is shown an alternative means for attaching wire basket 12 to coupling 24 of compression connector 19. Lower nut 20, compression ring 22, and coupling 24 are first secured to pole 14, and basket plate 30 is placed over upper end 32 of coupling 24 as described above with reference to FIG. 2. The surface of basket plate 30 around orifice 34 is then electric arc welded to upper end 32 of coupling 24, producing weld 42. In this case, upper nut 26 is not used.

Figure 4:
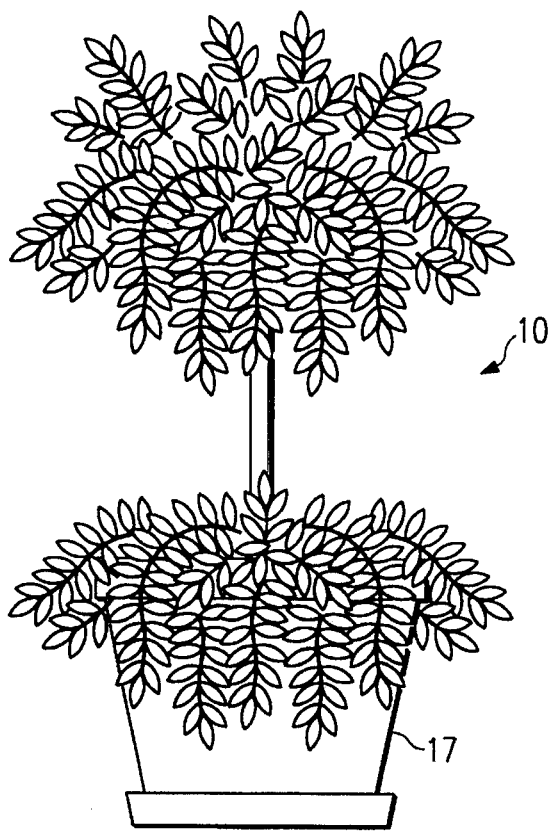
FIG. 4 illustrates the plant holder of FIG. 1 as it might appear with plants planted in its plant pot and wire basket.

Referring now to FIG. 4, there is shown elevated plant holder 10 of FIG. 1 as it might appear with plants placed in wire basket 12 and plant pot 17. Wire basket 12 and plant pot 17 may contain either natural or artificial plants. Preferably, the plant in wire basket 12 is further contained within an appropriately sized plant pot to retain the soil preparation and moisture. Pole 14 and wire basket 12 are preferably electroplated with green enamel paint to harmonize in color with the plants in plant holder 10 and plant pot 17. Wire basket 12 and pole 14 may also be wrapped or laced with moss or wicker for a highly decorative and attractive appearance.

Figure 5:
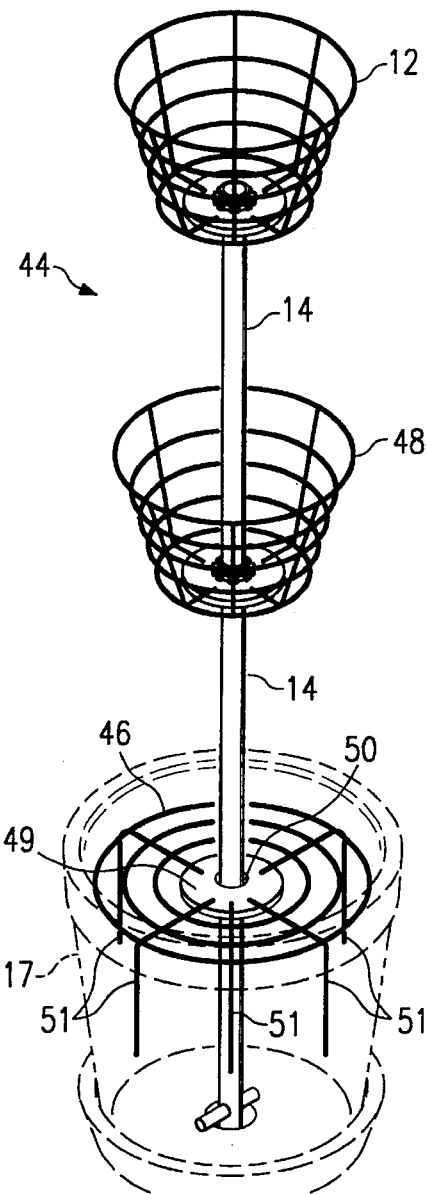
FIG. 5 is a perspective view of a first alternative embodiment of the present invention.

Referring now to FIG. 5, there is shown an elevated plant holder, generally designated 44, according to a first alternative embodiment of the present invention. Advantageously, plant holder 44 can be used in either a tapered or non-tapered plant pot. Plant holder 44 differs from plant holder 10 described above with reference to FIGS. 1 and 2 in that plant holder 44 employs a frame 46 for securing pole 14 to plant pot 17. Plant holder 44 also includes a second, tiered wire basket 48 located coaxially with, but spaced below, wire basket 12 on pole 14. In other respects, plant holder 44 is similar to plant holder 10.

Frame 46 is preferably a grate made from gauge 10 steel wire by electric arc welding. Metal plate 49 is welded to the center of frame 46. Metal plate 49 has a centrally located orifice 50 through which pole 14 is inserted. The outer, round edge of frame 46 is disposed against the tapered interior surface of plant pot 17. Frame 46 preferably includes a plurality of wire legs 51 extending downward from points equally spaced around its outer peripheral edge. Wire legs 51 bend as necessary to conform to the interior shape of plant pot 17, and secure the outer edge of frame 46 to plant pot 17. The length of each wire leg 51 is preferably half the diameter of the upper, circular portion of frame 46. Frame 46 is preferably electroplated with green enamel paint.

The outer diameter of frame 46 will vary with the range of sizes of tapered plant pots 17 for which plant holder 44 is designed to be used. Orifice 50 in metal plate 49 is sized slightly lager than the outer diameter of pole 14 so that frame 46 can move freely up and down pole 14 to accommodate different sized tapered plant pots 17.

An advantage of using frame 46 instead of cross arms 16 to secure pole 14 to plant pot 17 is that frame 46 provides a flat supporting surface within plant pot 17, which surface can support a plurality of small potted plants or other articles. A fiber mat, layer of water permeable fiber or plastic film, or layer of moss or similar material placed over frame 46 will provide a raised floor within plant pot 17 and will reduce the amount of potting soil necessary to fill plant pot 17. It should be noted that plant holder 44 can also be used in a plant pot having a non-tapered, cylindrical interior surface (not illustrated). In this case, the lower ends of wire legs 51 will rest on the bottom of the non-tapered plant pot. It should also be noted that plant holder 44 can also be used alone, without any plant pot, over a dirt or earth base. In this case, the lower end of pole 14 is anchored into the ground, and the lower portions of wire legs 51 are inserted into the ground around pole 14 to secure pole 14 in a vertical position.

Although frame 46 has been illustrated as having a round overall shape in FIG. 5, it is to be understood that frame 46 of other shapes may also be used in a plant pot of round horizontal cross-section. For example, a square shaped frame 46 will support pole 14 laterally from four equally spaced points on the interior wall surface of plant pot 17. A triangular shaped frame 46 will support pole 14 laterally from three equally spaced points on the interior wall surface of plant pot 17. Many other shapes and configurations may also be envisioned for frame 46, and the present invention is not limited to the illustrated embodiment.

Wire basket 48 is similar to wire basket 12 except perhaps larger to present a tiered appearance to plant holder 44. Wire basket 48 is secured to pole 14 by a compression connector (not illustrated) in the manner described above with reference to FIG. 2. It should be noted, however, that a commercially available electrical conduit end connector, such as the No. 02105 Compression Type Connector sold by Arialet Manufacturing Co., Cleveland, Ohio requires modification in order to install it other than at the end of a length of conduit. The inner diameter of both ends of compression connector 19 must be sufficiently large to fit over pole 14. The position of wire basket 48 on pole 14 may easily be changed by moving the associated compression connector up or down on pole 16. Additional tiered wire baskets (not illustrated) may also be attached to pole 14 as desired.

Figure 6:
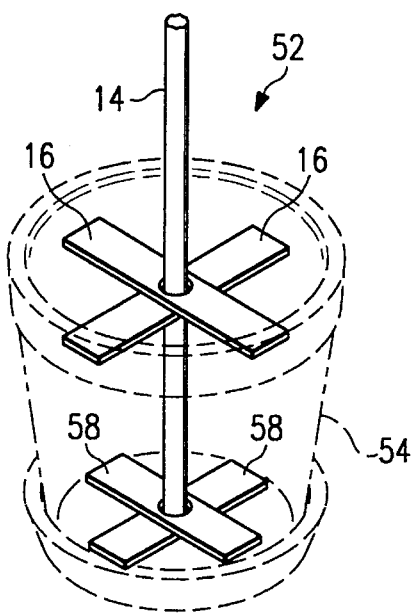
FIG. 6 is a partial perspective view of a second alternative embodiment of the present invention.

Referring now to FIG. 6, there is shown the lower portion of an elevated plant holder, generally designated 52, according to a second alternative embodiment of the present invention. Plant holder 52 is intended specifically for use in a plant pot 54 which lacks a drain hole 36 in the center of its bottom. However, plant holder 52 may also be used in a plant pot having a center drain hole. Plant holder 52 includes a pair of cross arms 16 as described above with reference to FIG. 1. In addition, plant holder 52 includes a pair of anchoring arms 58. Anchoring arms 58 are structurally and functionally similar to cross arms 16. However, anchoring arms 58 are of a shorter length than cross arms 16 so as to fit within plant pot 54 at or near its bottom. Anchoring arms 58 anchor the lower end of pole 14 at the bottom center of plant pot 54, and serve the same purpose as hole 36 in plant pot 17 of FIG. 1. The upper portion of plant holder 52 is like plant holder 10 or 44 described above, and is therefore not illustrated.

Although the invention has been described and illustrated herein with wire baskets 12 and 48 providing the means for supporting a plant from pole 14, it is to be understood that other containers, such as plastic baskets and various types of pots and buckets, may be used instead of a wire basket in the elevated plant holder of the present invention for supporting a plant from pole 14.

The elevated plant holder of the present invention, and many of its intended advantages, will be understood from the foregoing description and it will be apparent that, although the invention and its advantages have been described in detail, various changes, substitutions, and alterations may be made in the form, construction, and arrangement of the parts thereof without departing from the spirit and scope of the invention as defined by the appended claims, or sacrificing its material advantages, the form hereinbefore described being merely a preferred or exemplary embodiment thereof.

What is claimed is:

1. A device for supporting a plant above a plant pot having a circular bottom, tapered interior surface walls and a rim, which comprises:

an upstanding pole having a lower end near the bottom of the plant pot and an upper end;

a frame having a central orifice therein and having a circular peripheral edge disposed against the interior surface of the plant pot, the pole passing through the central orifice in the frame; and a basket attached to the upper end of the pole for holding the plant;

wherein the frame comprises:

a substantially planar wire grate having a peripheral edge;

a plurality of spaced apart wire legs extending perpendicularly downward from the peripheral edge of the wire grate for securing the frame to the plant pot; and a plate disposed near the center of the wire grate, the plate having a centrally disposed orifice therein, the pole passing through the orifice in the plate.

2. A device for supporting a plant above a plant pot having a circular bottom, tapered interior surface walls and a rim, which comprises:

an upstanding pole having a lower end near the bottom of the plant pot and an upper end;

a frame having a central orifice therein and having a circular peripheral edge disposed against the interior surface of the plant pot, the pole passing through the central orifice in the frame; and a basket attached to the upper end of the pole for holding the plant and at least one additional basket attached to the pole below the basket attached to the upper end of the pole, for holding additional plants in a tiered arrangement.

3. A device for supporting a plant above a plant pot having a circular bottom with an orifice centrally disposed in said bottom, tapered interior surface walls and a rim, which comprises:

an upstanding pole having a lower end adapted to fit within said orifice and an upper end;

a circular frame having a central orifice therein for receiving said upstanding pole, said frame being adapted to engage the tapered interior surface walls of said plant pot intermediate the bottom and the rim of said plant pot; and a means for affixing an additional plant pot to the upper end of said upstanding pole;

wherein said frame comprises a wire grate having a circular periphery.

4. A device for supporting a plant above a plant pot having a circular bottom, tapered interior surface walls and a rim, which comprises:

an upstanding pole having a lower end near the bottom of the plant pot and an upper end;

a frame having a central orifice therein and having a circular peripheral edge disposed against the interior surface of the plant pot, the pole passing through the central orifice in the frame; and a basket attached to the upper end of the pole for holding the plant;

wherein the frame comprises:

a substantially planar wire grate having a peripheral edge; and a plurality of spaced apart wire legs extending downward from the peripheral edge of the wire grate for securing the frame to the plant pot.

5. A device for supporting a plant above a plant pot having a circular bottom, tapered interior surface walls and a rim, which comprises:

an upstanding pole having a lower end near the bottom of the plant pot and an upper end;

a generally circular frame having a central orifice therein for receiving said upstanding pole and a plurality of spaced apart wire legs extending away from said generally circular frame, said wire legs engaging said tapered interior surface walls of said plant pot intermediate said circular bottom and said rim of said plant pot to secure said frame to said plant pot; and a basket attached to said upper end of said upstanding pole for holding said plant.

6. The device of claim 5 wherein the circular bottom of said plant pot has an orifice centrally disposed therein and wherein said lower end of said upstanding pole is adapted to fit within said orifice.

* * * * *